(12) United States Patent
Kim

(10) Patent No.: US 10,722,769 B1
(45) Date of Patent: Jul. 28, 2020

(54) CART-ATTACHABLE MOBILE GOLF BAG

(71) Applicant: Sung Ho Kim, Seoul (KR)

(72) Inventor: Sung Ho Kim, Seoul (KR)

( * ) Notice: Subject to any disclaimer, the term of this patent is extended or adjusted under 35 U.S.C. 154(b) by 0 days.

(21) Appl. No.: 16/535,448

(22) Filed: Aug. 8, 2019

(30) Foreign Application Priority Data

Jan. 29, 2019 (KR) .................. 10-2019-0010850

(51) Int. Cl.
| | | |
|---|---|---|
| *A63B 55/30* | (2015.01) | |
| *B62B 1/20* | (2006.01) | |
| *A63B 55/00* | (2015.01) | |
| *A63B 55/60* | (2015.01) | |

(52) U.S. Cl.
CPC ............ *A63B 55/30* (2015.10); *A63B 55/406* (2015.10); *A63B 55/60* (2015.10); *B62B 1/202* (2013.01); *A63B 2209/08* (2013.01)

(58) Field of Classification Search
CPC .................................................... A63B 55/30
See application file for complete search history.

(56) References Cited

U.S. PATENT DOCUMENTS

| | | | | |
|---|---|---|---|---|
| 3,237,968 A | * | 3/1966 | Arsenault ............. | B62K 5/025 280/492 |
| 4,371,184 A | * | 2/1983 | Henden ................ | B62K 27/12 280/204 |

FOREIGN PATENT DOCUMENTS

| | | |
|---|---|---|
| KR | 20-0181900 | 5/2000 |
| KR | 1020130032554 | 4/2013 |

\* cited by examiner

*Primary Examiner* — John D Walters
*Assistant Examiner* — James J Triggs
(74) *Attorney, Agent, or Firm* — Lex IP Meister, PLLC

(57) ABSTRACT

Disclosed is a cart-attachable mobile golf bag, in which the golf bag is configured such that a head cover is detachably attached to an upper portion of a bag body storing golf clubs therein, and the golf bag is attached to a cart in a docking manner by engagement between a docking recess of the golf bag and a docking block of the cart inserted into the docking recess in a one-touch manner, thus making it possible that the golf bag is simply and firmly attached to the cart without requiring any separate tying process. In particular, the golf bag has a hard-shell structure, thus being safe even without requiring a separate wrapping cover when transported by air while being excellent in durability, and further the golf bag provides various storage spaces for storing various equipment other than golf clubs, thus being excellent in use efficiency.

12 Claims, 11 Drawing Sheets

CART-ATTACHABLE MOBILE GOLF BAG

CROSS REFERENCE TO RELATED APPLICATION

The present application claims priority to Korean Patent Application No. 10-2019-0010850, filed Jan. 29, 2019, the entire contents of which is incorporated herein for all purposes by this reference.

BACKGROUND OF THE INVENTION

Field of the Invention

The present invention relates generally to a cart-attachable mobile golf bag. More particularly, the present invention relates to a cart-attachable mobile golf bag, in which the golf bag having a hard-shell structure is used in combination with a cart while being moved by being easily and firmly coupled to the cart in an attachable and detachable manner and in a one-touch docking manner, and also the golf bag provides various storage spaces for storing various equipment other than golf clubs, thus being excellent in use efficiency.

Description of the Related Art

Recently, with an improvement in living standards and an interest in health-related issues, various kinds of exercise are enjoyed by people, and in particular, golf is one of the most popular exercises enjoyed by many people, regardless of age.

In golf, a player walks on a golf course while carrying various golf equipment in a golf bag, such as golf clubs, golf balls, golf tees, golf shoes, gloves, and the like.

That is, golf bags in which various golf equipment is stored are carried and transported by the player while on the course during play of a round of golf.

Such golf bags in the related art are generally designed to be rollable by having moving wheels, handles, and the like because it is inconvenient to transport due to heavy weight. In particular, golf carts are used to carry and transport the golf bags along the course.

In a case where a golf bag is carried by a golf cart for transportation as described above, the golf bag is placed on the cart, and then the golf bag is tied to the cart by a separate tying means such that the golf bag is secured so as not to fall out of the cart during transportation.

However, the cart in the related art is problematic in that golf bag mounting or dismounting operation is very inconvenient, and the golf bag is not firmly secured to the cart and thus may be fall out of the same while being transported.

Additionally, the golf bag in the related art usually stores golf clubs inside a bag body, but is problematic in that it is inconvenient to use due to lack of a sufficient storage space for storing various golf equipment other than the golf clubs.

Moreover, the golf bag in the related art is usually made of leather or cloth and thus is problematic in that it is inconvenient to use because the golf bag is required to be wrapped with a separate cover box when transported by air, and also it is poor in durability and is difficult to ensure high safety in storing and transporting golf equipment.

The foregoing is intended merely to aid in the understanding of the background of the present invention, and is not intended to mean that the present invention falls within the purview of the related art that is already known to those skilled in the art.

Documents of Related Art (Patent document 1) Korean Patent Application Publication No. 10-2013-0032554 (published on Apr. 2, 2013)
(Patent document 2) Korean Utility Model Registration No. 20-0181900 (registered on Mar. 2, 2000)

SUMMARY OF THE INVENTION

Accordingly, the present invention has been made keeping in mind the above problems occurring in the related art, and an objective of the present invention is to provide a cart-attachable mobile golf bag, in which the golf bag having a hard-shell structure is used in combination with a cart while being moved by being easily and firmly coupled to the cart in an attachable and detachable manner and in a one-touch docking manner, and also the golf bag provides various storage spaces for storing various equipment other than golf clubs, while being excellent in use efficiency.

Another objective of the present invention is to provide a cart-attachable mobile golf bag, in which the golf bag has a hard-shell structure, thus being safe even without a separate wrapping cover when transported by air while being excellent in durability.

Still another objective of the present invention is to provide a cart-attachable mobile golf bag, in which a bag body of the golf bag and a head cover are configured to be attachable to and detachable from each other such that in addition to storage spaces provided inside the golf bag and provided in a front side thereof, the head cover coupled to an upper portion of the bag body is utilized as a storage space by being detached from the bag body and hooked onto a front side thereof, and a separate side pocket is utilized as a storage space by being attached to and detached from a side of the bag body, whereby the golf bag provides various storage spaces.

Still another objective of the present invention is to provide a cart-attachable mobile golf bag, in which a separate cloth cover is further provided such that golf clubs in the golf bag are simply taken out for use by opening the cloth cover with a zipper without requiring removal of the cloth cover, thus providing excellent use efficiency.

Still another objective of the present invention is to provide a cart-attachable mobile golf bag, in which moving wheels of the golf bag are configured to be adjusted in width therebetween, thus enabling the golf bag to be moved more stably and to be minimized in volume during storage of the golf bag, and a brake means is provided such that the golf bag is stably stood upright in a stationary state.

In order to achieve the above objectives, according to one aspect of the present invention, there is provided a cart-attachable mobile golf bag, including: a golf bag storing golf clubs in an inner space of a bag body and being moved by a moving wheel provided at each side of a lower portion thereof, the golf bag being configured such that a head cover is detachably attached to an upper portion of the bag body; and a cart including a vertical quadrangular support, a handle provided at an upper portion of the support, and left and right moving wheels provided at a lower portion of the support and connected to each other by a link member, and configured such that a docking block provided on a front surface of the cart is detachably coupled to a docking recess formed in a rear surface of the golf bag, wherein the docking block has a T-shaped structure having a locking protrusion at each side thereof, and the docking recess includes an insertion recess into which the docking block is inserted, and a locking recess extending from a lower side of the insertion recess and having a locking step by which each of the respective locking protrusions is lock and retained, whereby when the insertion recess of the golf bag is fitted over the docking block and then the golf bag is slided downward to cause the locking recess to be fitted over the docking block, the golf bag is attached to the cart in a one-touch docking manner.

According to the present invention, the bag body and the head cover of the golf bag may be made of any one of polycarbonate and an ABS material, and the head cover may be attached to the bag body in such a manner that a coupling protrusion formed in a lower outer side of the head cover is inserted into and rotated in a coupling recess formed in an upper outer side of the bag body, wherein the coupling protrusion may have a T-shaped cross-section, and the coupling recess may be configured such that an insertion portion into which the coupling protrusion is inserted and a locking portion preventing separation of the coupling protrusion are connected to each other, whereby when the coupling protrusion is inserted into and rotated in the coupling recess, the coupling protrusion and the coupling recess are engaged with each other to prevent separation.

According to the present invention, the head cover may include a hook provided at a side of a lower portion thereof, and the bag body may include a hook recess formed in a front surface thereof correspondingly to the hook such that the hook is inserted into the hook recess, whereby the head cover is detached from the bag body and then hooked thereto for storage in an inverted state by hanging the hook in the hook recess of the bag body.

According to the present invention, a separate cloth cover may be detachably attached to the upper portion of the bag body in place of the head cover, and the cloth cover may include a waterproof zipper provided at a center thereof such that the golf clubs are taken out for use by opening the waterproof zipper without requiring detachment of the cloth cover.

According to the present invention, each of the respective moving wheels of the bag body may be configured such that a wheel shaft that has multiple annular grooves formed along a longitudinal direction thereof is inserted into the bag body from each side of the bag body in an extendable and retractable manner, and a press pin is protrudingly inserted into a side of each of the respective wheel shafts from a lower portion of the bag body in a direction perpendicular to the wheel shaft such that the press pin is inserted into a side of one of the grooves of the wheel shaft to support the moving wheel of the bag body, wherein each of the respective press pins may include an annular grooved portion formed corresponding to a diameter of the wheel shaft such that when the grooved portion is moved into a position engaging the wheel shaft by elastically pressing the press pin, the wheel shaft is extended by a width between the grooves, thus adjusting a width between the moving wheels.

According to the present invention, the bag body may include a metal plate provided at each side thereof at a position inside a sidewall thereof, and a side pocket having a magnet may be separately provided to store various equipment by being attached and detached by a magnetic force exerted by the magnet at a position outside the side wall of the bag body correspondingly to the metal plate.

According to the present invention, each of the moving wheels of the cart may include a brake means restricting movement of the moving wheel of the cart, and the brake means may include an actuating lever vertically rotated about a hinge shaft by a pressing operation, an actuating pin having a rear end shafted to a lower end of the actuating lever so as to be moved forward by the pressing operation of the actuating lever, and a rotation restricting recess formed in a side surface of the moving wheel of the cart and restricting rolling of the moving wheel of the cart when the actuating pin moving forward is inserted thereinto.

As described above, the golf bag, which is configured such that the head cover is detachably attached to the upper portion of the bag body storing the golf clubs therein, is attached to the cart in a docking manner by engagement between the docking recess formed in the rear surface of the golf bag and the docking block of the cart inserted into the docking recess in a one-touch manner. This makes it possible that the golf bag is simply and firmly attached to the cart without requiring any separate tying process unlike the related art.

In particular, the golf bag has a hard-shell structure, whereby it is possible that the golf bag is safe even without a separate wrapping cover when transported by air while being excellent in durability.

Furthermore, the separate cloth cover is attached in place of the head cover of the golf bag, whereby it is possible that the golf clubs in the golf bag are simply taken out for use by opening the cloth cover with the zipper without requiring removal of the cloth cover.

Furthermore, in addition to the storage spaces provided inside the golf and provided in the front side thereof, the head cover is utilized as a storage space for storing additional equipment by being detached from the bag body and hooked onto the front side thereof, and the separate side pocket is utilized as a storage space by being attached to and detached from each side of the bag body by a magnetic force, whereby it is possible that the golf bag provides various storage spaces that effectively stores various equipment.

Furthermore, due to adjustment of the width between the moving wheels of the golf bag, it is possible that the golf bag is moved more stably while being moved and is minimized in volume during storage of the golf bag, and due to provision of the brake means, it is possible that the golf bag is stably stood upright in a stationary state.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION OF THE INVENTION

Figure 1:
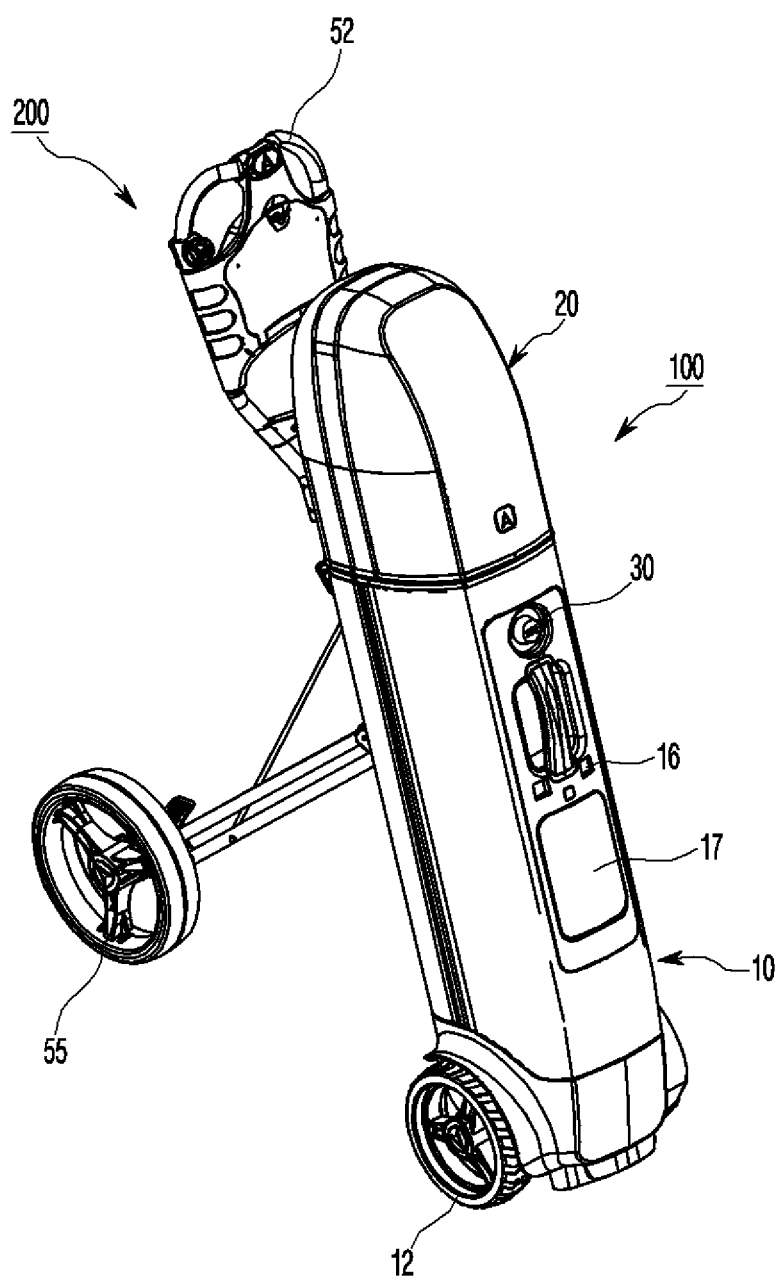
FIG. 1 is a front perspective view of the present invention.
Figure 2:
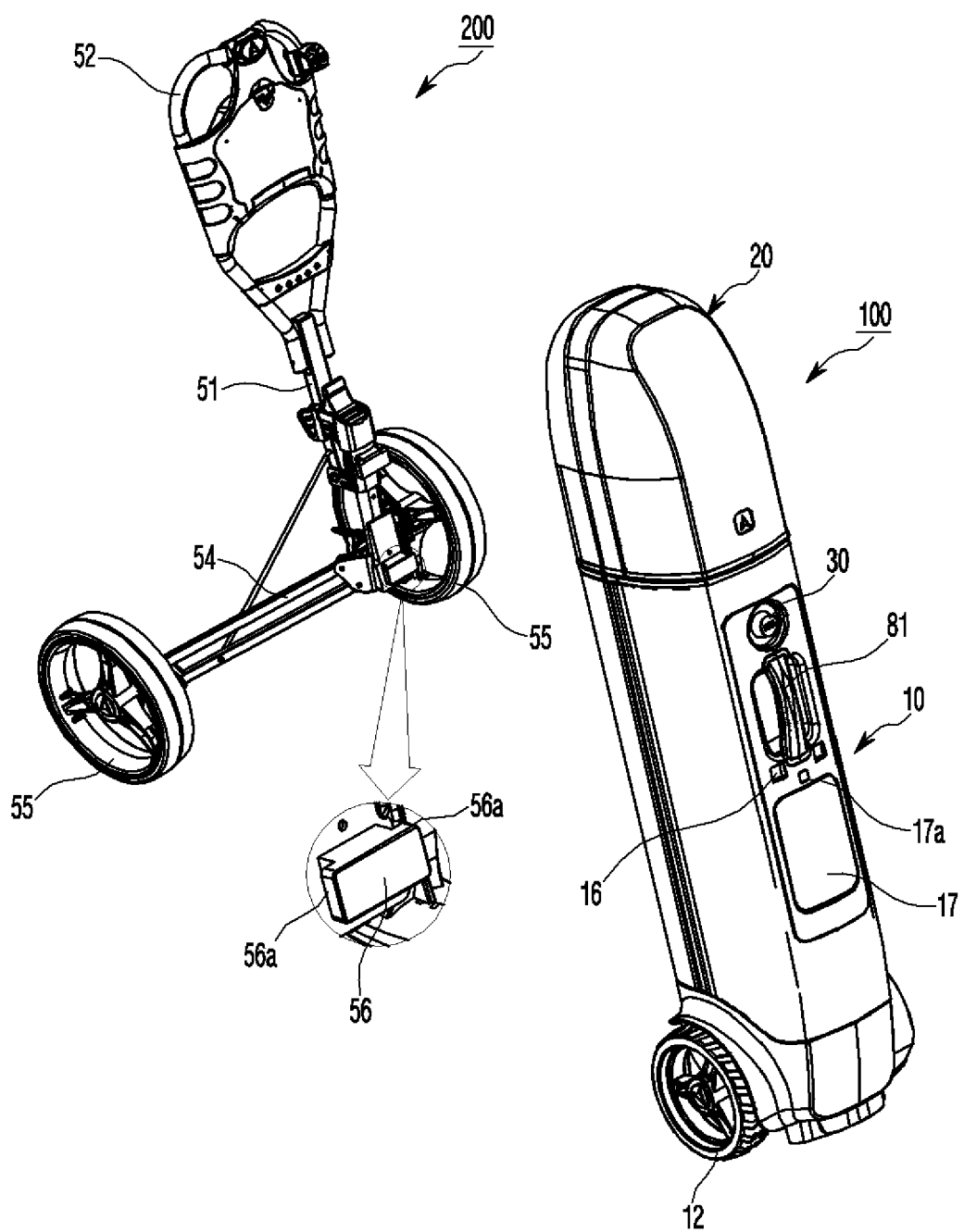
FIG. 2 is a perspective view showing a state in which a golf bag and a cart according to an embodiment the present invention are detached from each other.
Figure 3:
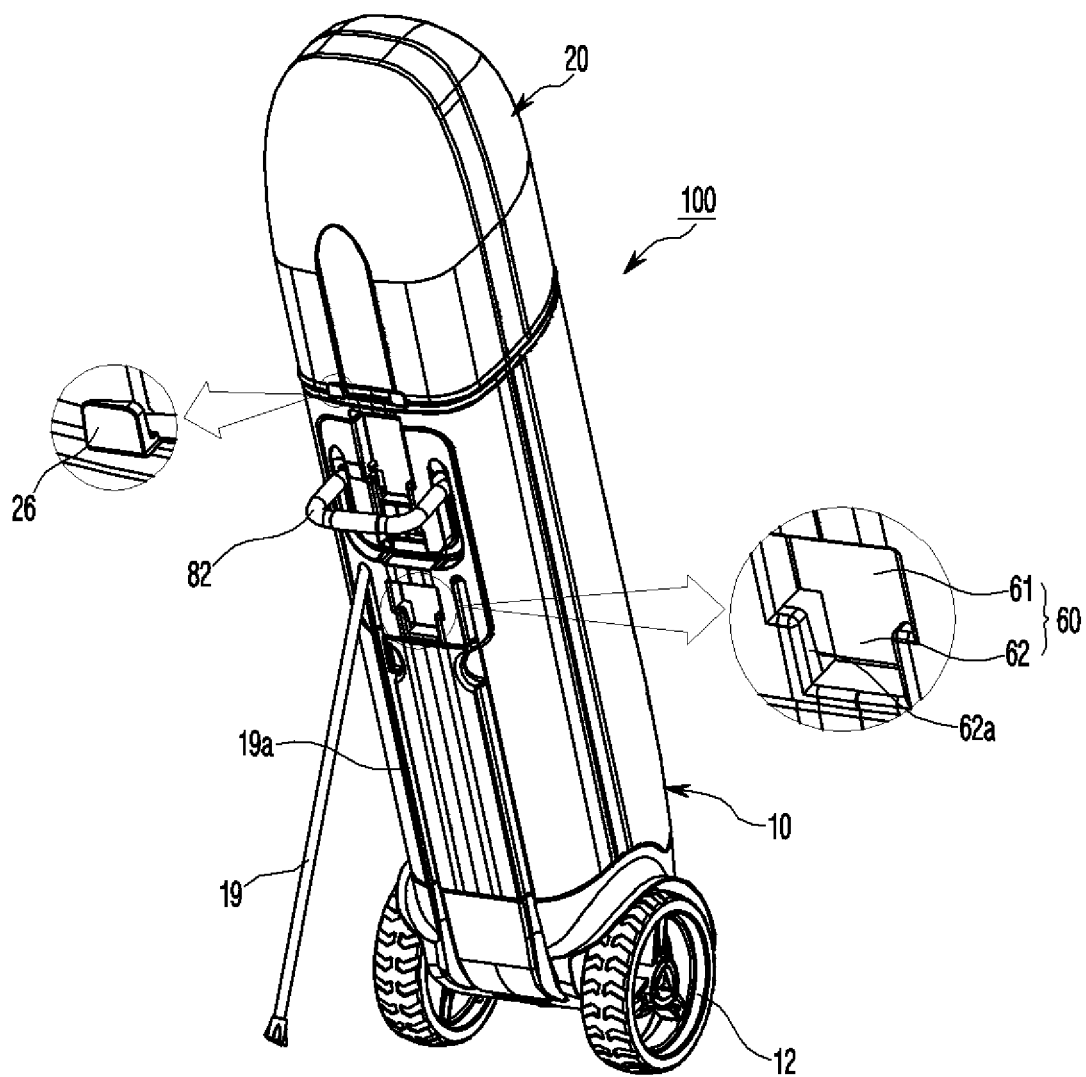
FIG. 3 is a rear perspective view showing the golf bag according to the present invention.
Figure 4:
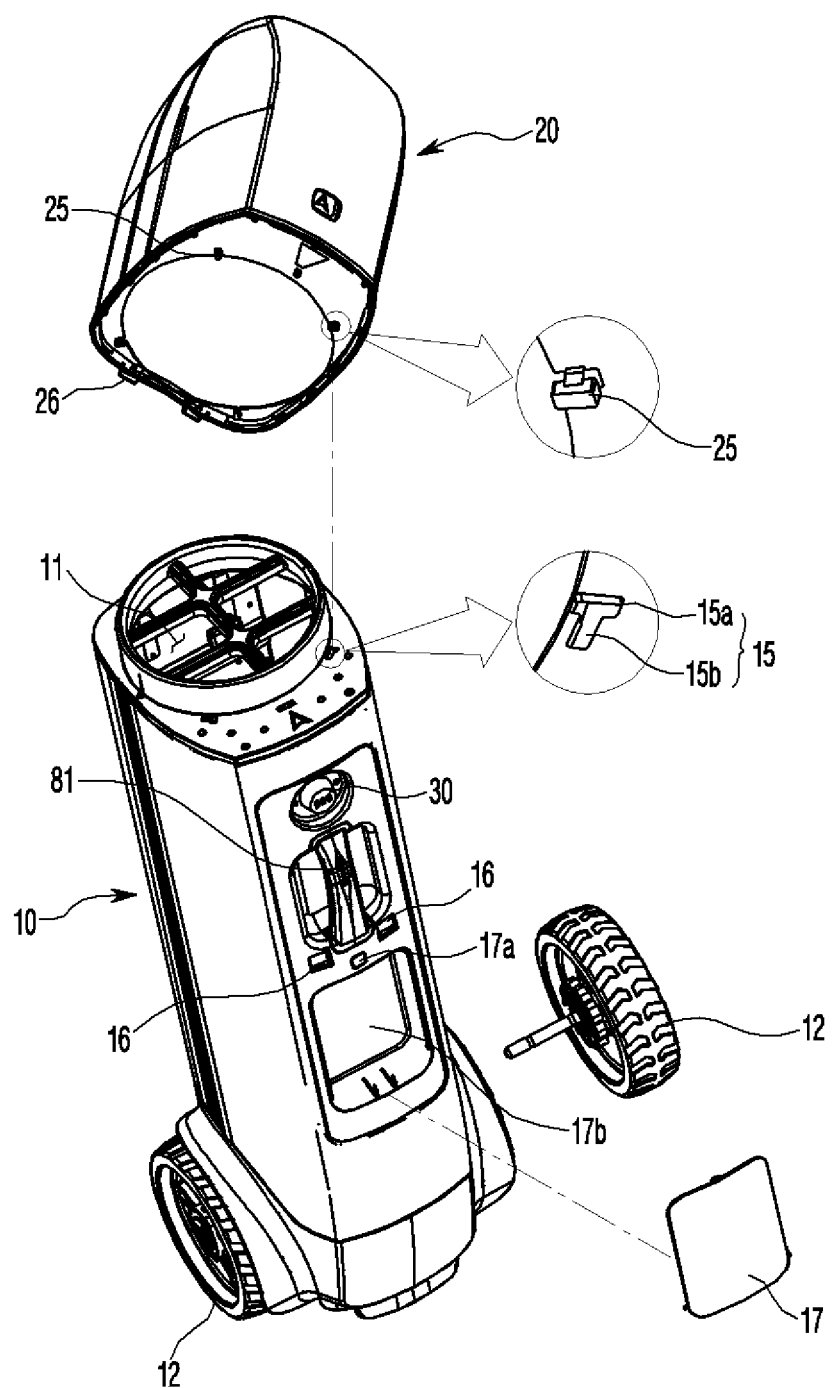
FIG. 4 is a perspective view showing a state in which a head cover of the golf bag according to the present invention is detached.
Figure 5:
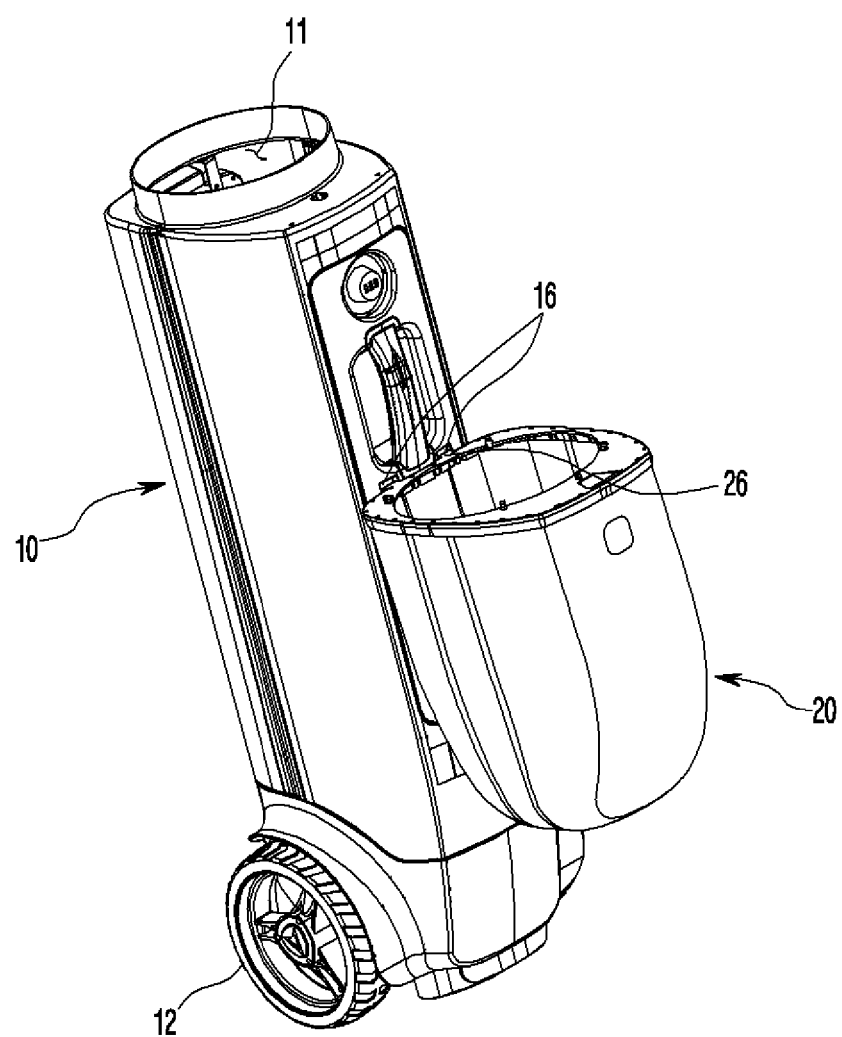
FIG. 5 is a perspective view showing a state in which the head cover of the golf bag according to the present invention is detached and hooked onto a front side of a bag body.
Figure 6:
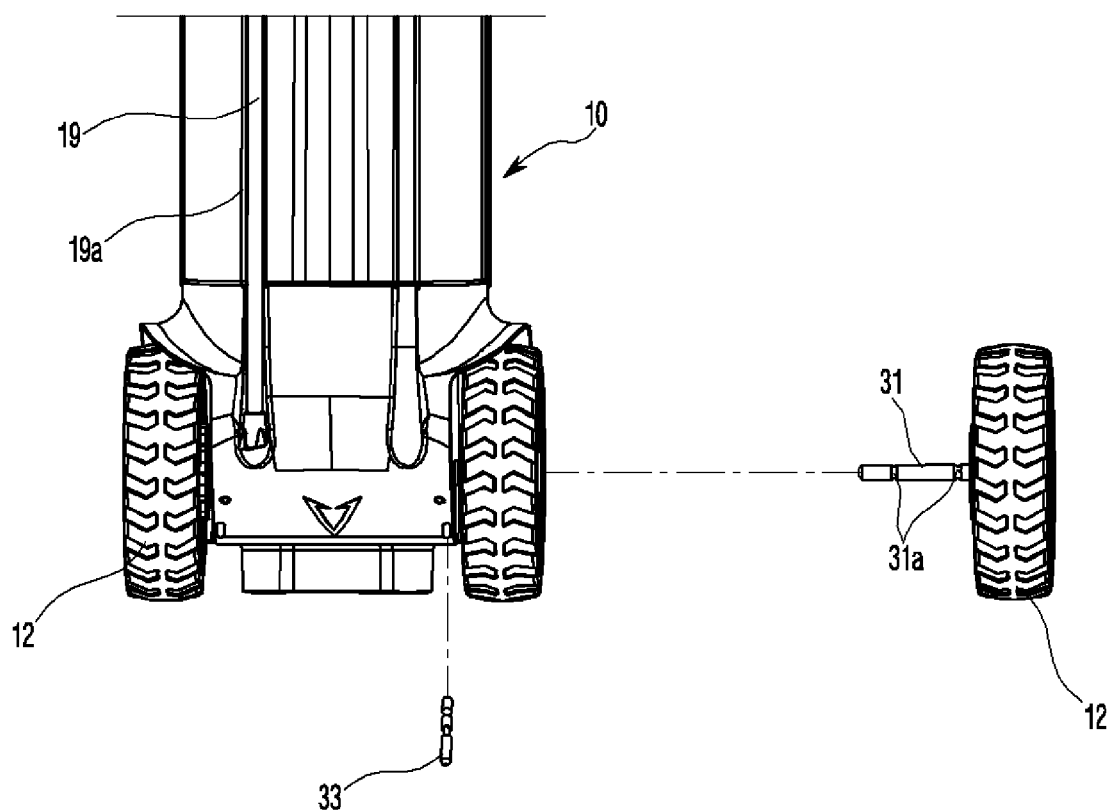
FIG. 6 is a rear view showing moving wheels of the golf bag according to the present invention.
Figure 7:
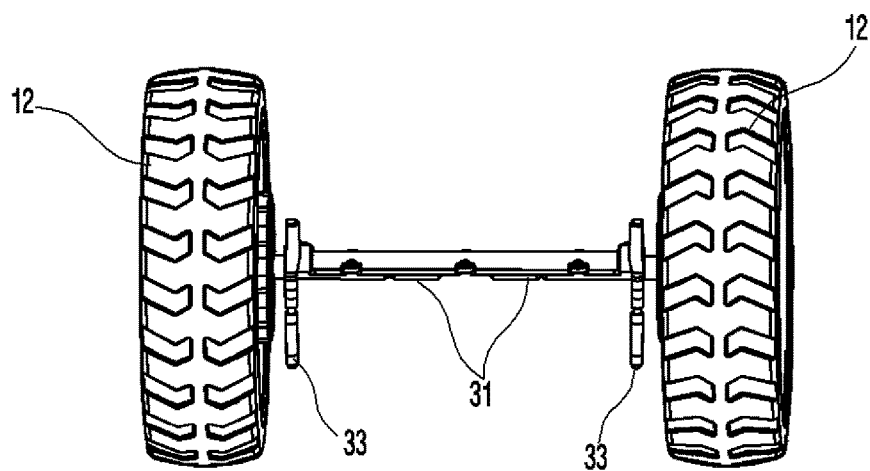
FIG. 7 is a rear view showing a state in which the moving wheels of FIG. 6 are removed.
Figure 8:
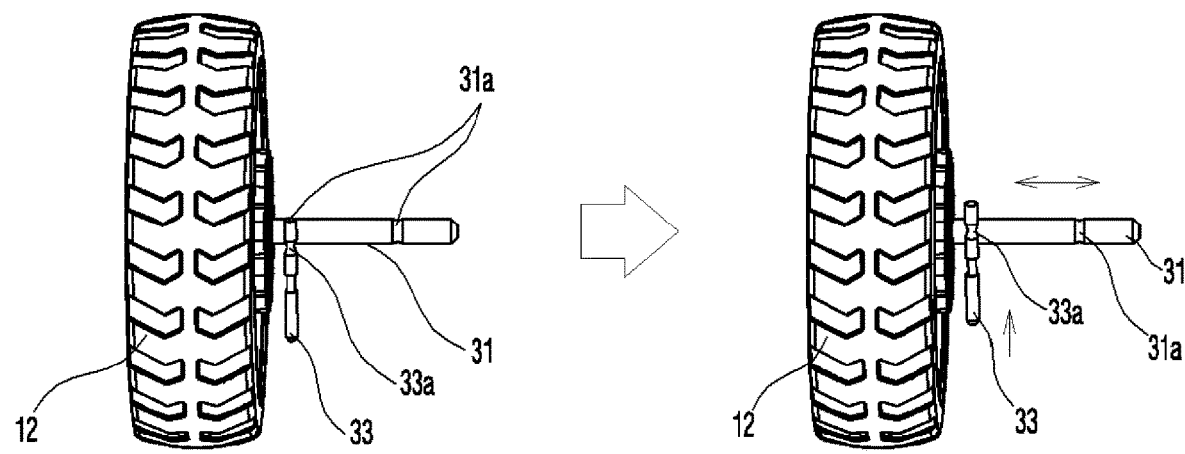
FIG. 8 is a view showing an extension and retraction control operation of the moving wheels of FIG. 6.
Figure 9:
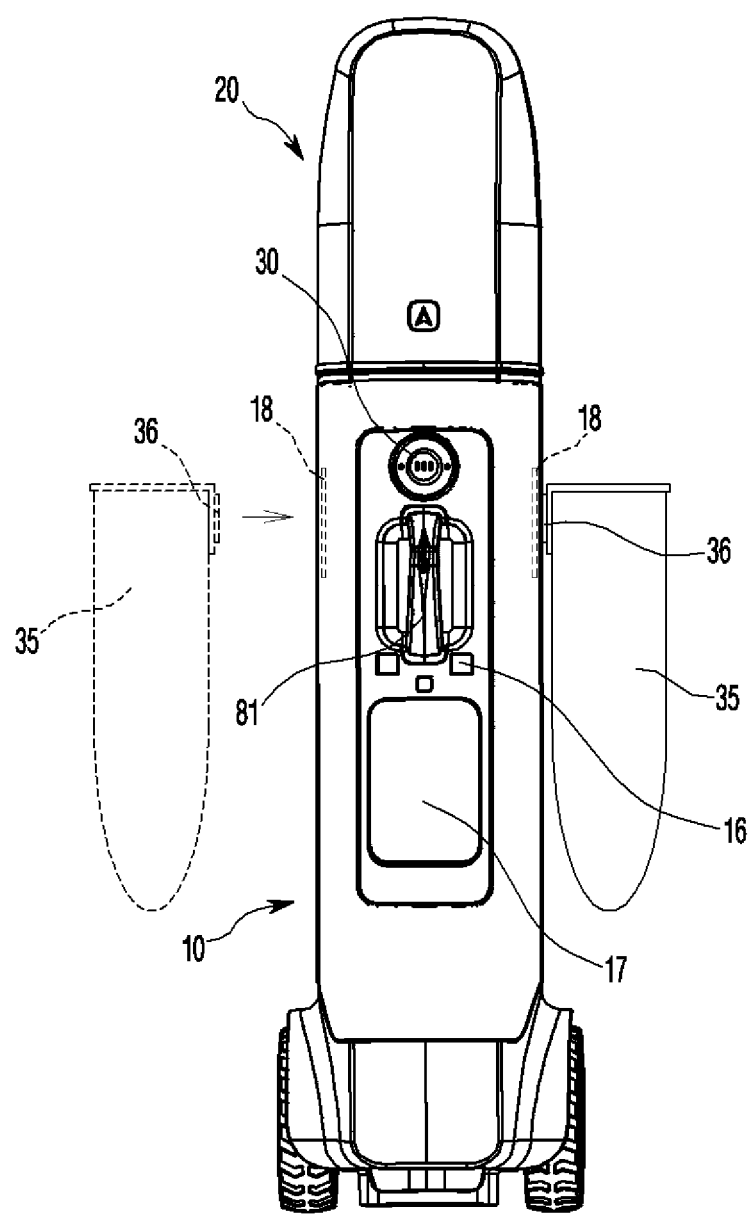
FIG. 9 is a front view showing a golf bag according to another embodiment of the present invention.

Hereinbelow, exemplary embodiments of the present invention will be described in detail with reference to the accompanying drawings. Throughout the drawings, the same reference numerals will refer to the same or like parts.

As shown in FIGS. 1 to 12, a cart-attachable mobile golf bag according to the present invention includes a golf bag 100 having a hard-shell structure and a cart 200 attached to the golf bag in a one-touch docking manner.

The golf bag 100 includes: a bag body 10 including an inner space portion 11 for storing golf clubs, a moving wheel 12 provided at each lower side thereof, and inner and outer handles; and a head cover 20 detachably attached to an upper portion of the bag body.

The bag body 10 and the head cover 20 are made of polycarbonate and ABS material such that when the golf bag is transported in the air, the golf bag protects safely the golf clubs without requiring a separate wrapping cover, unlike a soft material such as cloth, and also has sufficient durability.

The head cover 20 has a double lock structure in which: the head cover is provided with a coupling protrusion 25 protruding from a lower outer side thereof and rotatably inserted into a coupling recess 15 formed in an upper outer side of the bag body 10 such that the coupling protrusion and the coupling recess are engaged with each other to prevent separation; and the head cover is opened and locked by a separate circular lock 30.

At this time, the coupling protrusion 25 of the head cover has a T-shaped cross-section, and the coupling recess 15 of the bag body is configured such that an insertion portion 15a into which the coupling protrusion is inserted and a locking portion 15b preventing separation of the coupling protrusion are connected to each other, whereby when the coupling protrusion 25 is inserted into and rotated in the coupling recess 15, the coupling protrusion and the coupling recess are engaged to prevent separation. Furthermore, the head cover 20 is provided with a hook 26 at a side of a lower portion thereof, and the bag body 10 is provided with a hook recess 16 formed in a front surface thereof correspondingly to the hook such that the hook is inserted into the hook recess. Due to this configuration, the head cover is detached from the bag body 10 and then hooked thereto for storage by hanging the hook 26 in the hook recess 16 of the bag body. Herein, the hooked head cover 20 is stored in an inverted state such that various golf equipment, such as a club head cover, other accessories, and the like is stored in an inner space of the head cover.

Furthermore, instead of the head cover 20, a cloth cover 20' is separately provided such that the cloth cover 20' is attached to the upper portion of the bag body in place of the head cover. The cloth cover 20' is provided at a center thereof with a waterproof zipper 21 such that the golf clubs in the bag body are conveniently taken out for use by opening the waterproof zipper without requiring removal of the cloth cover. Furthermore, the bag body 10 is provided at a front center thereof with a front door 17. The front door is configured to be released by pressing of a button 17a and is opened while being elastically rotated by an elastic spring such that various equipment is stored in a storing portion 17b. Furthermore, the bag body 10 is provided at each side thereof with a metal plate 18 at a position inside a sidewall of the bag body, and a side pocket 35 having a magnet 36 is separately provided to store various equipment by being attached and detached by a magnetic force exerted by the magnet at a position outside the side wall of the bag body correspondingly to the metal plate.

At this time, the side pocket 35 is made of a cloth material so as to be easily carried in a folded state when not in use.

Furthermore, each of the respective moving wheels 12 of the bag body 10 is configured such that a wheel shaft 31 that has multiple annular grooves 31a formed along a longitudinal direction thereof is inserted into the bag body 10 from each side of the bag body in an extendable and retractable manner, and a press pin 33 is protrudingly inserted into a side of each of the respective wheel shafts from a lower portion of the bag body in a direction perpendicular to the wheel shaft such that the press pin is inserted into a side of one of the grooves 31a of the wheel shaft 31 to support the moving wheel 12. Herein, each of the respective press pins 33 is provided with an annular grooved portion 33a corresponding to the diameter of the wheel shaft such that when the grooved portion 33a is moved into a position engaging the wheel shaft 31 by elastically pressing the press pin, the wheel shaft is extended by a width between the grooves 31a, thus adjusting the width between the moving wheels 12.

That is, due to adjustment of the width between the moving wheels 12, it is possible that the golf bag is moved more stably when moving, and also the golf bag is minimized in volume when stored.

Herein, the press pin 33 is elastically supported by an elastic spring (not shown) such that when an external force is removed after a pressing operation, the press pin is returned to an original position by the elastic spring and thus supports the wheel shaft 31 of the moving wheel 12 again.

Furthermore, the bag body 10 is provided in a rear surface thereof with a supporting bar 19 inserted into an embedding groove 19a vertically formed in a longitudinal direction of the bag body. Herein, an upper end of the supporting bar is shafted to the embedding groove such that when the bag body is needed to stand upright, a lower end of the supporting bar is rotated to support the bag body in a standing upright position.

The cart 200 includes a vertical quadrangular support 51, a handle 52 provided at an upper portion of the support, left and right moving wheels 55 provided at a lower portion of the support and connected to each other by a link member 54, and a docking block 56 provided on a front surface of the cart and coupled to a docking recess 60 formed in a rear surface of the golf bag.

The docking block 56 has a T-shaped structure having a locking protrusion 56a at each side thereof. The docking recess 60 includes an insertion recess 61 into which the docking block is inserted, and a locking recess 62 extending from a lower side of the insertion recess and having a locking step 62a by which each of the respective locking protrusions 56a is locked and retained. Due to such configuration, when the insertion recess 61 of the golf bag is fitted over the docking block and then the golf bag is slided downward to cause the locking recess 62 to be fitted over the docking block, the golf bag is attached to the cart in a one-touch docking manner.

At this time, it is preferable that each of the docking block 56 and the docking recess 60 is provided at least two positions in a vertical direction such that the respective docking blocks and the respective docking recesses correspond to each other.

Furthermore, each of the moving wheels 55 of the cart is provided with a brake means 70 for restricting movement of the moving wheel 55. The brake means 70 includes an actuating lever 72 vertically rotated about a hinge shaft 71 by a pressing operation, an actuating pin 73 having a rear end shafted to a lower end of the actuating lever so as to be moved forward by the pressing operation of the actuating lever, and a rotation restricting recess 58 formed in a side surface of the moving wheel 55 and restricting rolling of the moving wheel 55 when the actuating pin moving forward is inserted thereinto.

The actuating pin 73 may have a simple pin structure. However, it is preferable that the actuating pin 73 has a cylinder structure as shown in the drawings and is guided to be moved forward or rearward by a guide.

Undescribed reference numerals 81 and 82 denote handles respectively provided at a front side and a rear side of the bag body.

Hereinafter, the operation and action of the present invention configured as described above will be described.

The golf bag 100 according to the present invention is used in combination with the cart 200 by storing golf clubs in the inner space 11 of the bag body 10 and then attaching the head cover 20 to the bag body, or is used while being moved by the moving wheels 12 without combination with the cart.

At this time, attachment of the head cover 20 is performed in such a manner that the coupling protrusion 25 formed in the lower outer side of the head cover and having a T-shaped cross-section is inserted into the coupling recess 15 formed in the upper outer side of the bag body 10. In this manner, the coupling protrusion 25 is inserted into the insertion portion 15a of the coupling recess and then the head cover is rotated to cause the coupling protrusion 25 to be positioned in the locking portion 15b of the insertion portion, whereby the head cover is firmly attached to the bag body so as not to be separated therefrom.

Since the bag body 10 and the head cover 20 of the golf bag 100 are made of polycarbonate, an ABS material, and the like to have a hard-shell structure, it is possible that when the golf bag is transported by air, the golf bag protects safely the golf clubs inside without requiring a separate wrapping cover.

When the golf bag 100 according to the present invention is needed to be used in combination with the cart 200, the docking block 65 of the T-shaped structure formed on the front surface of the support 51 of the cart is inserted into the insertion recess 61 formed in an upper portion of the docking recess 60 formed in the rear surface of the bag body.

Then, when the docking block 56 of the cart is slid downward into the locking recess 62 located at a lower location of the insertion recess 61, the locking steps 62a at opposite sides of the locking recess 62 lock the locking protrusions 56a at opposite sides of the docking block 56, whereby the golf bag is simply attached to the cart in a docking manner so as not to be separated therefrom. This makes it possible that the golf bag is simply and firmly attached to the cart in a one-touch manner without requiring any separate tying process as in the related art.

After the golf bag 100 is attached to the cart 200 in a docking manner as described above, the golf bag is used while being moved by the moving wheels 55 of the cart and the moving wheels 12 of the golf bag. Herein, to enable the golf bag 100 to be moved more stably, the moving wheels 12 of the golf bag 100 is adjusted in width.

This means that when each of the press pins 33 protruding outwardly from each side of the lower portion of the bag body is pressed, the press pin 33, which is in a state of supporting the wheel shaft 31 to restrict an extending and retracting motion of the wheel shaft by being inserted into one of the grooves 31a formed in the wheel shaft of the moving wheel 12, transitions to a state of permitting the extending and retracting motion of the wheel shaft 31 when the grooved portion 33a of the press pin is positioned on the wheel shaft.

In this state, when the wheel shaft 31 of the moving wheel 12 is extended to allow the remaining one of the grooves 31a formed in the wheel shaft along the longitudinal direction thereof to be positioned on the press pin, and then the pressing operation of the press pin is removed, the press pin is elastically returned to the original position thereof. This causes a large-diameter portion of the press pin rather than the grooved portion 33a to be inserted into the remaining one of the grooves 31a of the wheel shaft, thus locking the wheel shaft 31 of the moving wheel 12.

By controlling the extending and retracting motion of the left and right moving wheels 12 of the golf bag in such a manner, the golf bag is used by adjusting the width between the moving wheels 12.

The golf bag 100 according to the present invention as described above is used while being easily moved in combination with the cart, and when the golf clubs in the bag body 10 are needed to be used, the head cover 20 is detached from the bag body and then the golf clubs are taken out.

At this time, the detached head cover 20 to be stored is hooked to the bag body by inserting the hook 26 provided at the side of the lower portion thereof into the hook recess 16 formed in the front surface of the bag body.

Herein, since the hooked head cover 20 is stored in an inverted state, various equipment, such as a club head cover, other accessories, and the like may be stored in the head cover.

Furthermore, the side pocket 35 may be attached to each side of the bag body 10 to store various equipment. This is realized by attaching the respective side pockets 35 to positions corresponding to the respective metal plates 18 provided in the side wall of the bag body 10 by a magnetic force exerted by the magnets 36 provided in the side pockets 35.

The side pockets 35 are made of a cloth material and thus can be simply stored in a different storage space in a folded state when not in use.

Figure 10:
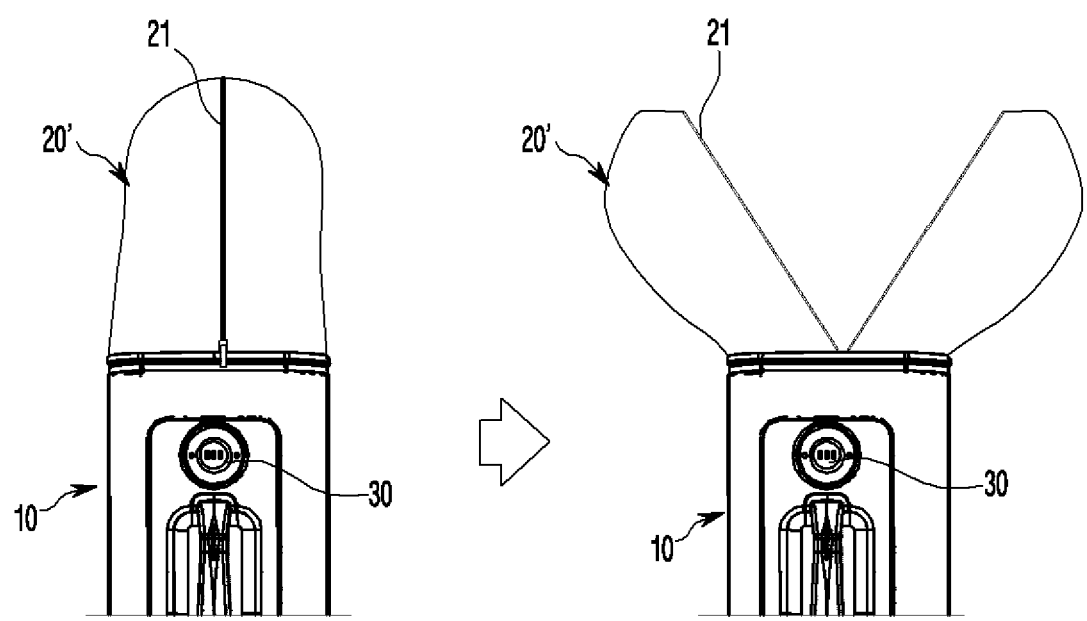
FIG. 10 is a front view showing a golf bag according to still another embodiment of the present invention.
Figure 11:
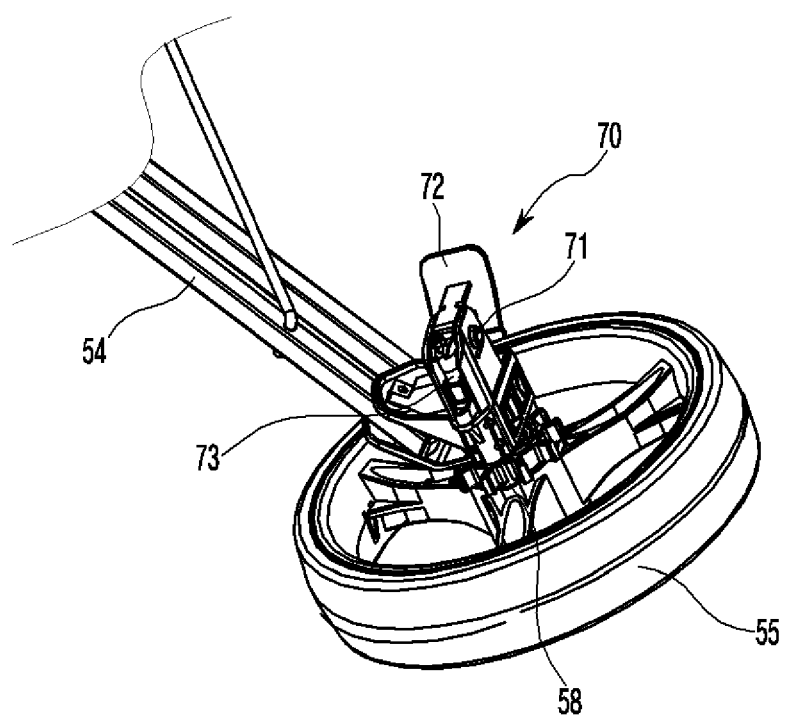
FIG. 11 is a main part perspective view showing a breaking means of the cart according to the present invention.
Figure 12:
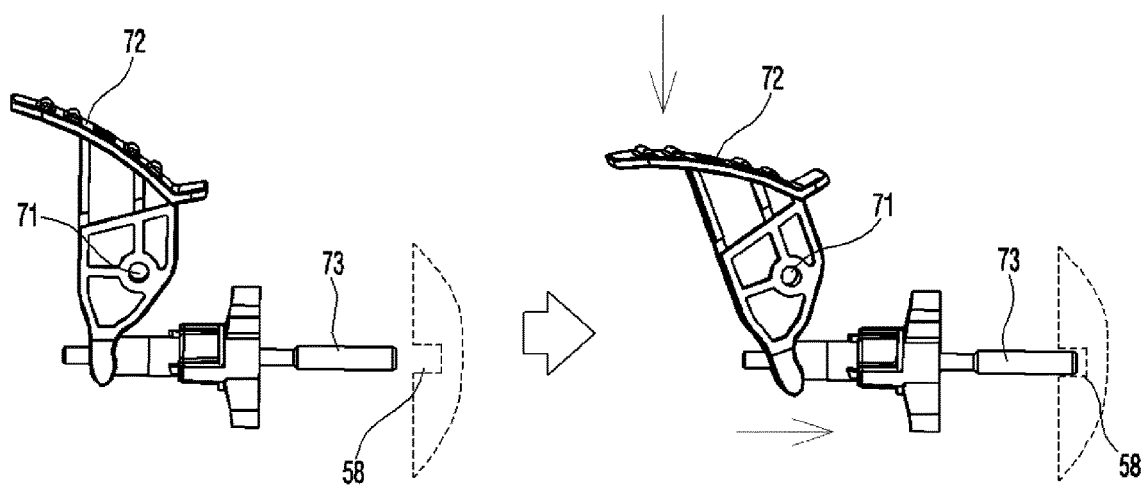
FIG. 12 is a main part front view showing an operating state of the brake means of FIG. 11.

On the other hand, as shown in FIG. 10, the separate cloth cover 20' is detachably attached to the upper portion of the bag body 10 in place of the head cover 20. Herein, since the cloth cover 20' is provided with the waterproof zipper 21 at the center thereof, the golf clubs in the bag body can be simply taken out for use by opening the waterproof zipper without requiring detachment of the cloth cover.

Furthermore, when the golf bag 100 according to the present invention is used while being moved in combination with the cart 200, it is possible that movement of the moving wheels 55 of the cart is restricted by the brake means 70 at a stationary position. This is realized in such a manner that when the actuating lever 73 provided at a side of each of the moving wheels 55 of the cart is pressed, the actuating lever 73 is rotated to cause the actuating pin 73 shafted to the lower end of the actuating lever 72 to be pressed and moved forward, and then the actuating pin 73 is inserted into the rotation restricting recess 58 formed in the side surface of the moving wheel 55, thus restricting movement of the moving wheel 55.

On the contrary, in a case where movement restriction of the moving wheels 55 is needed to be released, when the actuating lever 72 of the brake means 70 is pressed again, the actuating lever 72 is returned to the original position thereof while being rotated, causing the actuating pin 73 moved forward to be moved rearward back, thus permitting movement of the moving wheel 55.

On the other hand, in a case where the cart 200 is needed to be detached from the golf bag 100, in the reverse order of a docking operation, the docking block 56 of the cart is slid upward from the docking recess to be positioned in the insertion recess 61 located at an upper location of the locking recess 62, and then the cart is pulled forward and simply detached.

Although the exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A cart-attachable mobile golf bag, comprising:
   a golf bag storing golf clubs in an inner space of a bag body and being moved by a moving wheel provided at each side of a lower portion thereof, the golf bag being configured such that a head cover is detachably attached to an upper portion of the bag body; and
   a cart including a vertical quadrangular support, a handle provided at an upper portion of the support, and left and right moving wheels provided at a lower portion of the support and connected to each other by a link member, and configured such that a docking block provided on a front surface of the cart is detachably coupled to a docking recess formed in a rear surface of the golf bag,
   wherein the docking block has a T-shaped structure having a locking protrusion at each side thereof, and
   the docking recess includes an insertion recess into which the docking block is inserted, and a locking recess extending from a lower side of the insertion recess and having a locking step by which each of the respective locking protrusions is lock and retained, whereby when the docking block is inserted into the insertion recess of the golf bag and then is slid downward into the locking recess, the golf bag is attached to the cart in a one-touch docking manner.

2. The cart-attachable mobile golf bag of claim 1, wherein the bag body and the head cover of the golf bag are made of any one of polycarbonate and an ABS material, and
   the head cover is attached to the bag body in such a manner that a coupling protrusion formed in a lower outer side of the head cover is inserted into and rotated in a coupling recess formed in an upper outer side of the bag body, wherein the coupling protrusion has a T-shaped cross-section, and the coupling recess is configured such that an insertion portion into which the coupling protrusion is inserted and a locking portion preventing separation of the coupling protrusion are connected to each other, whereby when the coupling protrusion is inserted into and rotated in the coupling recess, the coupling protrusion and the coupling recess are engaged with each other to prevent separation.

3. The cart-attachable mobile golf bag of claim 1, wherein the head cover includes a hook provided at a side of a lower portion thereof, and
   the bag body includes a hook recess formed in a front surface thereof correspondingly to the hook such that the hook is inserted into the hook recess, whereby the head cover is detached from the bag body and then hooked thereto for storage in an inverted state by hanging the hook in the hook recess of the bag body.

4. The cart-attachable mobile golf bag of claim 1, wherein a separate cloth cover is detachably attached to the upper portion of the bag body in place of the head cover, and
   the cloth cover includes a waterproof zipper provided at a center thereof such that the golf clubs are taken out for use by opening the waterproof zipper without requiring detachment of the cloth cover.

5. The cart-attachable mobile golf bag of claim 1, wherein each of the respective moving wheels of the bag body is configured such that a wheel shaft that has multiple annular grooves formed along a longitudinal direction thereof is inserted into the bag body from each side of the bag body in an extendable and retractable manner, and a press pin is protrudingly inserted into a side of each of the respective wheel shafts from a lower portion of the bag body in a direction perpendicular to the wheel shaft such that the press pin is inserted into a side of one of the grooves of the wheel shaft to support the moving wheel of the bag body, wherein
   each of the respective press pins includes an annular grooved portion formed corresponding to a diameter of the wheel shaft such that when the grooved portion is moved into a position engaging the wheel shaft by elastically pressing the press pin, the wheel shaft is extended by a width between the grooves, thus adjusting a width between the moving wheels.

6. The cart-attachable mobile golf bag of claim 1, wherein the bag body includes a metal plate provided at each side thereof at a position inside a sidewall thereof, and
   a side pocket having a magnet is separately provided to store various equipment by being attached and detached by a magnetic force exerted by the magnet at a position outside the side wall of the bag body correspondingly to the metal plate.

7. The cart-attachable mobile golf bag of claim 1, wherein each of the moving wheels of the cart includes a brake means restricting movement of the moving wheel of the cart, and
   the brake means includes an actuating lever vertically rotated about a hinge shaft by a pressing operation, an actuating pin having a rear end shafted to a lower end of the actuating lever so as to be moved forward by the pressing operation of the actuating lever, and a rotation restricting recess formed in a side surface of the moving wheel of the cart and restricting rolling of the moving wheel of the cart when the actuating pin moving forward is inserted thereinto.

8. The cart-attachable mobile golf bag of claim 2, wherein the head cover includes a hook provided at a side of a lower portion thereof, and
   the bag body includes a hook recess formed in a front surface thereof correspondingly to the hook such that the hook is inserted into the hook recess, whereby the head cover is detached from the bag body and then hooked thereto for storage in an inverted state by hanging the hook in the hook recess of the bag body.

9. The cart-attachable mobile golf bag of claim 2, wherein a separate cloth cover is detachably attached to the upper portion of the bag body in place of the head cover, and
   the cloth cover includes a waterproof zipper provided at a center thereof such that the golf clubs are taken out for use by opening the waterproof zipper without requiring detachment of the cloth cover.

10. The cart-attachable mobile golf bag of claim 2, wherein each of the respective moving wheels of the bag body is configured such that a wheel shaft that has multiple annular grooves formed along a longitudinal direction thereof is inserted into the bag body from each side of the bag body in an extendable and retractable manner, and a press pin is protrudingly inserted into a side of each of the respective wheel shafts from a lower portion of the bag body in a direction perpendicular to the wheel shaft such that the press pin is inserted into a side of one of the grooves of the wheel shaft to support the moving wheel of the bag body, wherein each of the respective press pins includes an annular grooved portion formed corresponding to a diameter of the wheel shaft such that when the grooved portion is moved into a position engaging the wheel shaft by elastically pressing the press pin, the wheel shaft is extended by a width between the grooves, thus adjusting a width between the moving wheels.

11. The cart-attachable mobile golf bag of claim 2, wherein the bag body includes a metal plate provided at each side thereof at a position inside a sidewall thereof, and a side pocket having a magnet is separately provided to store various equipment by being attached and detached by a magnetic force exerted by the magnet at a position outside the side wall of the bag body correspondingly to the metal plate.

12. The cart-attachable mobile golf bag of claim 2, wherein each of the moving wheels of the cart includes a brake means restricting movement of the moving wheel of the cart, and the brake means includes an actuating lever vertically rotated about a hinge shaft by a pressing operation, an actuating pin having a rear end shafted to a lower end of the actuating lever so as to be moved forward by the pressing operation of the actuating lever, and a rotation restricting recess formed in a side surface of the moving wheel of the cart and restricting rolling of the moving wheel of the cart when the actuating pin moving forward is inserted thereinto.

\* \* \* \* \*